US008484520B2

(12) United States Patent
Maeda et al.

(10) Patent No.: US 8,484,520 B2
(45) Date of Patent: Jul. 9, 2013

(54) PROCESSOR CAPABLE OF DETERMINING ECC ERRORS

(75) Inventors: Seiji Maeda, Kanagawa (JP); Kenta Yasufuku, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 414 days.

(21) Appl. No.: 12/862,081

(22) Filed: Aug. 24, 2010

(65) Prior Publication Data

US 2011/0055647 A1    Mar. 3, 2011

(30) Foreign Application Priority Data

Aug. 27, 2009   (JP) .................................. 2009-197259

(51) Int. Cl.
*G11C 29/00* (2006.01)
(52) U.S. Cl.
USPC ........................................... 714/719; 714/754
(58) Field of Classification Search
USPC .............................. 714/52, 719, 751, 752, 754
See application file for complete search history.

(56) References Cited

U.S. PATENT DOCUMENTS

| 4,768,197 | A | * | 8/1988 | Petolino et al. ................ 714/754 |
|---|---|---|---|---|
| 5,533,189 | A | * | 7/1996 | Cheong et al. ................ 714/6.24 |
| 5,535,226 | A | * | 7/1996 | Drake et al. ................... 714/773 |
| 6,804,799 | B2 | * | 10/2004 | Zuraski, Jr. ..................... 714/54 |
| 7,565,593 | B2 | * | 7/2009 | Dixon et al. ................... 714/754 |
| 2002/0029365 | A1 | * | 3/2002 | Sato et al. ...................... 714/763 |
| 2009/0006905 | A1 | * | 1/2009 | Luick .............................. 714/52 |
| 2009/0150744 | A1 | * | 6/2009 | Flynn et al. .................... 714/752 |
| 2009/0276609 | A1 | * | 11/2009 | Moyer et al. .................. 712/220 |
| 2009/0327833 | A1 | * | 12/2009 | Suto .............................. 714/752 |

FOREIGN PATENT DOCUMENTS

JP         04-369733       12/1992

* cited by examiner

*Primary Examiner* — Joshua Lohn
(74) *Attorney, Agent, or Firm* — Turocy & Watson, LLP

(57) ABSTRACT

A processor has an ALU, a load/store unit, a timer, an ECC calculator, and a plurality of ECC registers. When the load/store unit writes data in a main memory, the load/store unit writes written data and a count value of a timer in the main memory, and sets ECC status flag which indicates that an ECC about the written data is not correct in the main memory, and causes the ECC calculator to calculate the ECC about the written data after setting the ECC status flag, and writes the calculated ECC in the main memory and resets the ECC status flag after the ECC is calculated.

20 Claims, 7 Drawing Sheets

| | DATA (128bit) | ECC (9bit) | stat (3bit) |
|---|---|---|---|
| 0 | | | |
| 1 | | | |
| 2 | | | |
| 3 | | | |
| . | | | |
| . | | | |
| . | | | |
| Addr → | DATA | ECC | 1 1 0 |
| . | | | |
| . | | | |
| . | | | |

PROCESSOR CAPABLE OF DETERMINING ECC ERRORS

CROSS-REFERENCE TO RELATED APPLICATION(S)

This application is based upon and claims the benefit of priority from the prior Japanese Patent Application No. 2009-197259 filed in Japan on Aug. 27, 2009; the entire contents of which are incorporated herein by this reference.

FIELD

Embodiments described herein relate generally to a processor, and particularly to a processor configured to load data from and store data in a storage section configured to store data including error correction code.

BACKGROUND

Conventionally, for example, as disclosed in Japanese Patent Application Laid-Open Publication No. 4-369733, it is often a case that a processor which uses error correction code for data protection needs a plurality of cycles with respect to a clock of the processor to perform calculation of error correction code.

For example, when some data (for example, of 128 bits) stored in a memory or a cache memory is updated, calculation of error correction code (for example, of 9 bits) is performed for the whole updated data (128 bits), and the updated data and the error correction code (hereinafter also referred to as ECC) are written in the memory at the same time. In this case, a time for a plurality of cycles is required for the calculation of the ECC.

There is also a case where a part of some data (that is, data less than 128 bits) is updated. In this case, for example, whole data (128 bits) already stored in a memory or the like is read, a whole (128 bits) of the read data in which update data is reflected is generated, an ECC for the whole data is calculated, and the updated data and the ECC are simultaneously written in the memory.

In other words, although 128-bit data already stored does not need to be read if data to be written is 128-bit data, there is also a case where a part of data is updated in data update processing. Therefore operation cycles need to be reserved for three processes: reading, ECC calculation, and writing. For example, if address calculation, reading, ECC calculation, and writing require two cycles, one cycle, two cycles, and one cycle respectively, data update processing, that is, data store processing necessarily requires six cycles. In the store processing, these six cycles are a processing sequence having a longest processing time, which is a so-called critical path.

On the other hand, in a case of processing for only data reading, that is, data load processing, if address calculation requires two cycles and reading requires one cycle, the data read processing requires three cycles.

In a case where there is a difference in the number of cycles between the store processing and the load processing, there is a problem that when reading of update data is performed immediately after data update, data before being updated is read from the memory or the like. To prevent reading of incorrect data due to the difference between the store processing and the load processing of such data as described above, a so-called forwarding circuit is provided.

The forwarding circuit is a circuit configured to forward subsequent load processing by cycles corresponding to the number of written data in preceding store processing. The forwarding circuit is configured such that if there is reading of data immediately after processing for writing data in a memory or the like at the same address as of the reading, the data is read from a plurality of registers which hold data written a plurality of cycles before, instead of from the memory or the like. To this end, the forwarding circuit has a plurality of address comparator circuits corresponding to a plurality of cycles.

For example, if a difference between data read processing and data update (i.e., write) processing is three cycles, the forwarding circuit has respective addresses of the previous three cycles and three address comparator circuits for comparison with a present read address, and further has three registers configured to hold written data corresponding to the three cycles.

Then, if address data has a large bit width such as 64 bits, signal lines corresponding to the number of bits of the address data are connected to the respective comparator circuits for comparison, and signal lines having a large bit width such as 128 bits are connected to the respective registers for output. As a result, there is a problem that a size of the forwarding circuit becomes larger, and an area of the forwarding circuit also becomes larger on a semiconductor chip implementing a CPU.

DETAILED DESCRIPTION

According to one aspect of the present invention, a processor which can execute pipeline processing can be provided which includes an ALU and a load/store unit, wherein when the load/store unit writes data in a storage section, the load/store unit writes written data and a count value counted according to a predetermined clock in the storage section, and sets an ECC status flag which indicates that an ECC about the written data is not correct in the storage section, and causes calculation of the ECC about the written data after setting the ECC status flag, and writes the calculated ECC in the storage section and resets the ECC status flag after the ECC is calculated, and wherein when the load/store unit reads data from the storage section, the load/store unit reads the data, and the ECC status flag, the count value and the ECC about the data from the storage section, and executes recalculation of an ECC from the read data, and if the ECC status flag about the read data has been set, the load/store unit determines an ECC for comparison among ECCs held by a plurality of registers based on the read count value, and compares the recalculated ECC with the ECC for comparison, and if the ECC status flag about the read data has not been set, the load/store unit compares the recalculated ECC with the read ECC, so that ECC error is determined.

Hereinafter, embodiments of the present invention will be described with reference to the drawings.

(First Embodiment)

1. Overall Configuration of Processor

Figure 1:
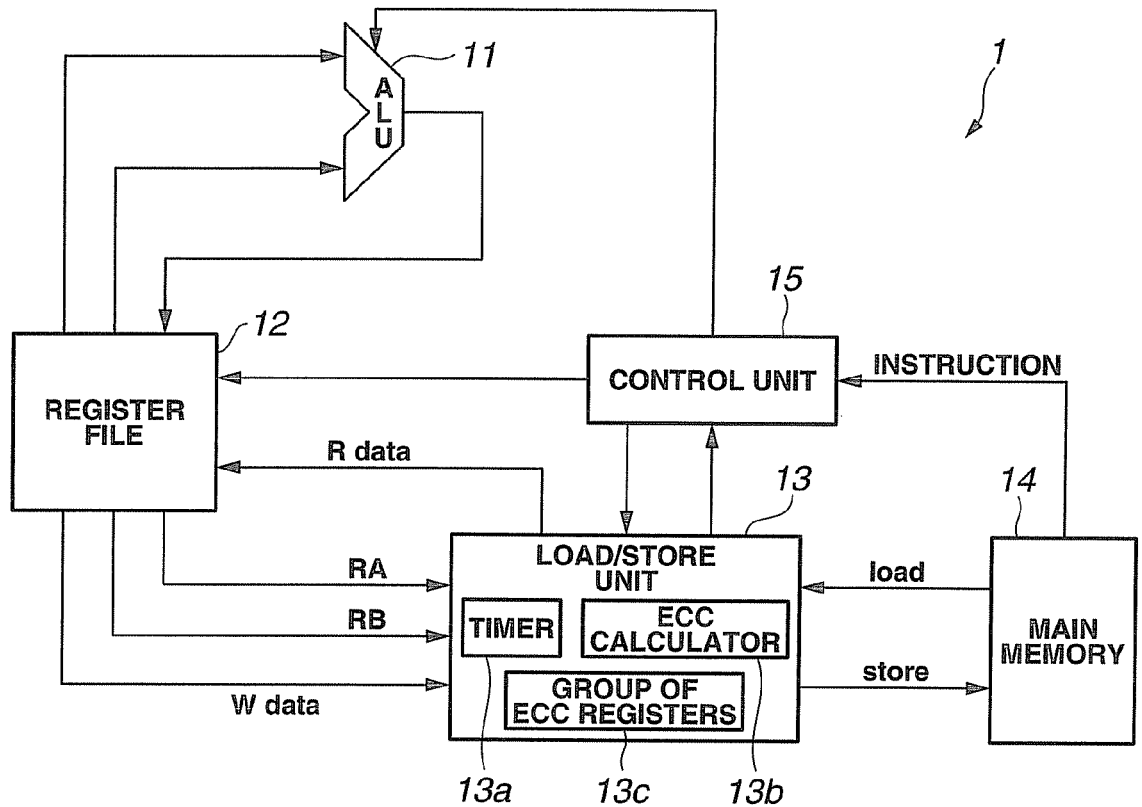
FIG. 1 is a schematic configuration diagram showing a configuration of a processor according to a first embodiment of the present invention.

First, a schematic configuration of a processor according to a first embodiment of the present invention will be described based on FIG. 1. FIG. 1 is a schematic configuration diagram showing a configuration of the processor according to the first embodiment of the present invention.

As shown in FIG. 1, a processor 1 is a one-chip semiconductor device, which includes an arithmetic and logic unit (hereinafter referred to as an ALU) 11, a register file 12, a load/store unit 13, a main memory 14 as a storage section, and a control unit 15. In the present embodiment, the processor 1 has a pipeline processing mechanism for enhancement of a processing speed, and each pipeline includes a plurality of stages. A process for executing each instruction of the processor 1 is divided into a plurality of process steps, and the process steps are sequentially executed in respective stages in synchronization with a clock. Because in each stage, process steps of different instructions can be executed at the same time, a plurality of instructions can be executed at the same time in a whole pipeline.

The control unit 15 is a circuit configured to perform overall control of the processor 1. For example, the control unit 15 reads an instruction from the main memory 14, controls the ALU 11, the register file 12, and the load/store unit 13, receives an ECC error from the load/store unit 13, and performs predetermined processing on the ECC error.

The ALU 11 performs a predetermined operation on data from the register file 12 and writes an operation result in the register file 12 under control of the control unit 15.

The load/store unit 13 is a circuit configured to perform load processing and store processing of data in and from the main memory 14 under control of the control unit 15. In a case of reading (loading) of data from the main memory 14, an address of read is supplied from the register file 12, and the load/store unit 13 reads the data from the main memory 14 based on the supplied address, and writes the read data (R data) in a register of the register file 12. In a case of writing (storing) of data into the main memory 14, written data (W data) is supplied from a register of the register file 12, and the load/store unit 13 writes the written data in a memory area specified by the address in the main memory 14.

In FIG. 1, a read address for loading is composed of a first address data RA and a second address data RB. The first address data RA is a starting address in memory space, and the second address data RB is data indicating an offset value from the first address data RA.

The processor 1 which can execute pipeline processing executes process steps based on an execution program in respective stages in a predetermined control sequence so that loading and storing of data are performed in the pipeline processing. Load processing and store processing of data are performed by the load/store unit 13 through the pipeline processing.

The load/store unit 13 includes a timer 13a, an ECC calculator 13b, and a group of ECC registers 13c. The timer 13a, the ECC calculator 13b, and the group of ECC registers 13c may be provided outside the load/store unit 13 instead of inside the load/store unit 13. The timer 13a is a counter configured to operate according to a predetermined clock in the processor 1 and be incremented according to the clock. The timer 13a is a two-bit counter in the embodiment. The ECC calculator 13b is a circuit configured to calculate an ECC of input data. The group of ECC registers 13c includes a plurality of ECC registers. The number of the ECC registers is determined according to a time difference between read processing and write processing of data (that is, a difference in the number of cycles therebetween). In the embodiment, the number of ECC registers is three, which holds ECCs in previous three cycles, i.e., three ECCs. Therefore, as described later, if read data is data written within previous three cycles, an ECC corresponding to the read data has been stored in the group of ECC registers 13c.

2. Data Structure

Figure 2:
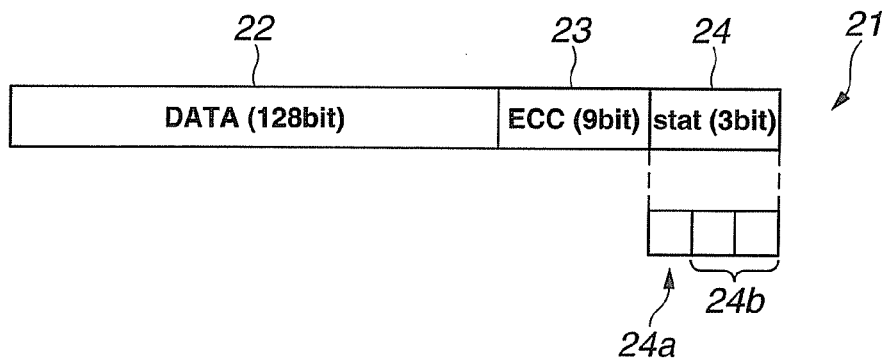
FIG. 2 is a diagram showing an example of a data structure of data stored in a main memory 14 according to the first embodiment of the present invention.

FIG. 2 is a diagram showing an example of a data structure of data stored in the main memory 14. Each data 21 stored in the main memory 14 is 140-bit data including a data section 22 composed of 128-bit data, an ECC section 23 composed of 9-bit ECC, and an ECC status bit section 24 composed of 3-bit ECC status bits (stat). Data of the data section 22 is data which is to be calculated or is a calculation result. An ECC of the ECC section 23 is an error correction code about the data of the data section 22.

The ECC status bits (stat) are data including flag data 24a, and a count value 24b of the timer 13a. The flag data 24a is ECC status flag indicating an ECC status, which indicates whether an ECC is correct or whether an ECC is being recalculated. In the present embodiment, the flag data 24a is one-bit data in which "1" indicates that the ECC is not correct, in other words, corresponding data's ECC is being recalculated, and "0" indicates that the ECC is correct, in other words, corresponding data's ECC is not being recalculated. The count value 24b is a two-bit count value of the timer 13a which is written at a time of data writing.

While the flag data 24a as ECC status flag is one-bit in the embodiment, the flag data 24a may be plural bits. Also, the count value of the timer 13a may be three or more bits.

Figures 3, 4:
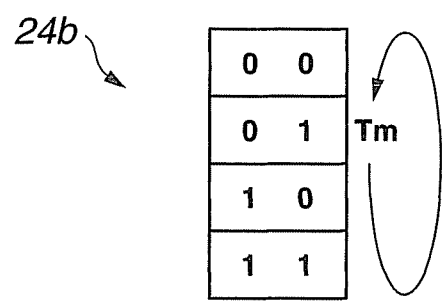
FIG. 3 is a diagram showing a data structure of the main memory 14 according to the first embodiment of the present invention.
FIG. 4 is a diagram illustrating a count value Tm of a timer 13a according to the first embodiment of the present invention.

FIG. 3 is a diagram showing a data structure of the main memory 14. An address Addr in memory space is specified to perform reading and writing of data (DATA) at the address Addr. An ECC and ECC status bits (stat) can be stored for each data.

In writing of data, the data, an ECC, and ECC status bits (stat) can be written independently, and in reading of data, the data, an ECC, and ECC status bits (stat) can be read at the same time.

As described with reference to FIG. 2, ECC status bits (3 bits) of the ECC status bit section 24 is added to each data in the main memory 14 which is a memory array having an ECC, in addition to data (128 bits) of the data section 22 and the ECC (9 bits) of the ECC section 23. Each data can be written in units of 1 byte which is a minimum access unit.

As described later, in the present embodiment, writing of data, an ECC, and ECC status bits (stat) is performed in two batches. In first writing, written data (W data) is written, and further the flag data 24a indicates that an ECC of the written data (W data) is being recalculated (that is "1") and a count value Tm of the timer 13a at this time are written in a corresponding address of the main memory 14. Then, the ECC of the written data (W data) is calculated over a plurality of clocks. In second writing, the calculated ECC is written as the ECC of the written data (W data), and at the same time, the flag data 24a is changed to the flag data 24a that indicates the data is not being recalculated, and therefore is cleared (set to "0").

In other words, in FIG. 2, in a case of data writing, the data section 22 and the ECC status bit section 24 are written by first write processing, and the ECC and the flag data 24a that indicates the ECC is not being recalculated are written by second write processing In a case of data reading, data, an ECC, and ECC status bits (stat) are read from a corresponding address of the main memory 14. Recalculation of an ECC about the read data is performed. As described later, "read ECC" or "one ECC among the group of ECC registers 13c" is selected depending on a status of the flag data 24a of the read data, and the selected ECC is compared with the recalculated ECC. If the flag data 24a of the ECC status bit section 24 of the read data is "0", the recalculated ECC is compared with the ECC of the read data to check whether the read data is correct or not.

If the flag data 24a of the ECC status bit section 24 of the read data is "1", since the ECC of the read data is being recalculated (that is, the read data is data updated within previous three cycles), the recalculated ECC is compared with one ECC among the group of ECC registers 13c (an ECC of one ECC register which is selected according to a difference between the count value 24b of the ECC status bit section 24 and the current count value Tm of the timer 13a) to check whether the read data is correct or not.

3. Timer

FIG. 4 is a diagram illustrating the count value Tm of a timer 13a. The timer 13a is a counter which is incremented one by one according to a predetermined clock in the processor 1, and returns to "0" when counting up. As shown in FIG. 4, the timer 13a is a 2-bit counter, and the counter value Tm changes according to the clock. For example, the counter value Tm increments from "00" to "01" and then from "01" to "10", and finally increments to "11", and returns to "00".

In the embodiment, since a difference between the store processing and the load processing is three clocks, a 2-bit counter is used as the timer 13a to allow detection of a difference corresponding to at least three clocks.

4. Configuration of Load/Store Unit

Figure 5:
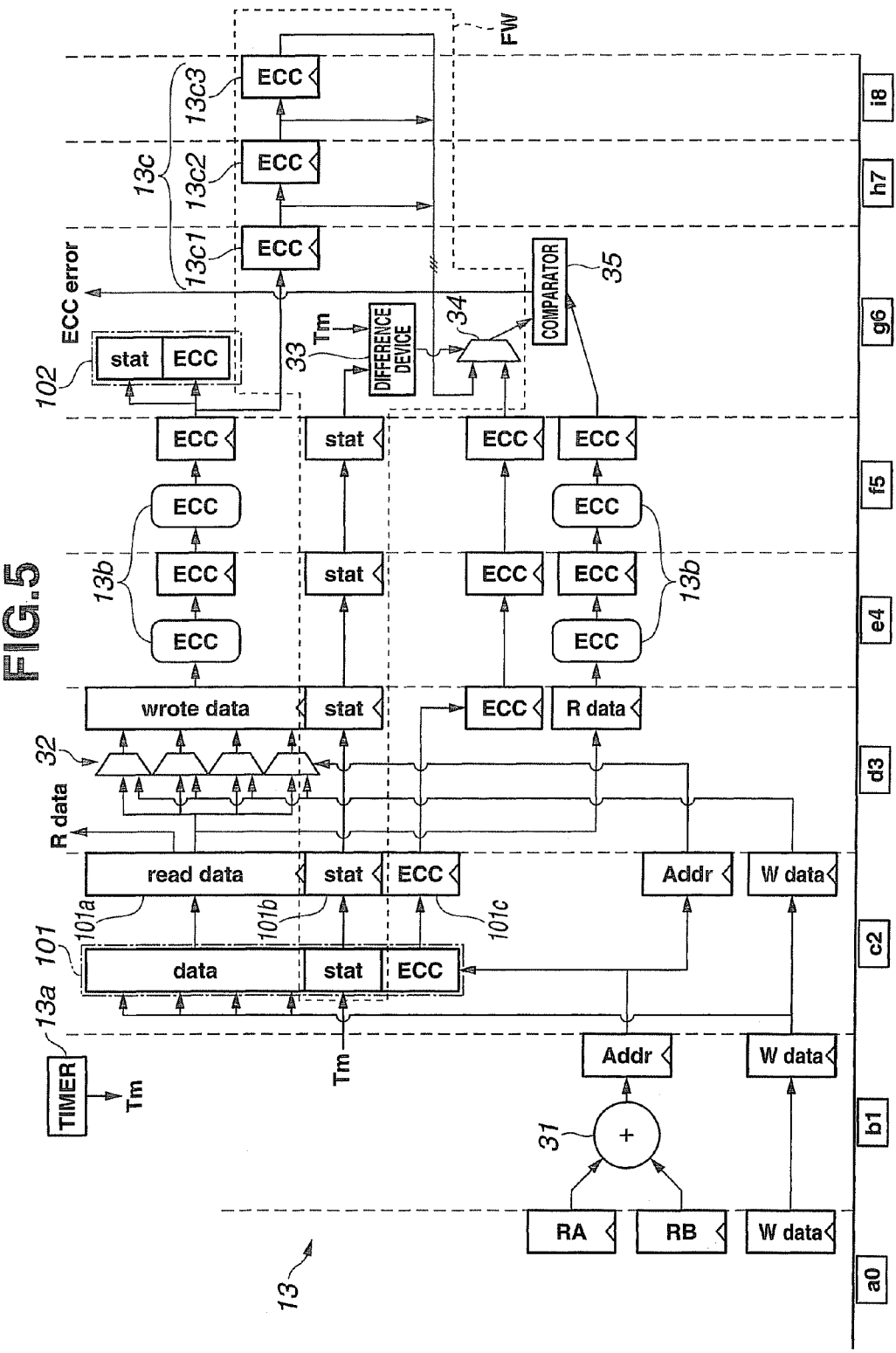
FIG. 5 is a configuration diagram showing a configuration of a load/store unit 13 according to the first embodiment of the present invention.

FIG. 5 is a configuration diagram showing a configuration of the load/store unit 13. As shown in FIG. 5, the load/store unit 13 has a pipeline structure and includes nine stages. The load/store unit 13 has the timer 13a, the ECC calculator 13b, and the group of ECC registers 13c as described above, and further has an address calculator 31, a group of selectors 32, a difference device 33, a selector 34, and a comparator 35. Each of stages will be described below. In FIG. 5, a block having no symbol represents a register.

In stage a0, addresses RA, RB for address calculation are set in two registers. If there is written data (W data), the written data (W data) is also set in another register. The written data (W data) is transferred to registers in stages b1, c2 in order.

In stage b1, the address calculator 31 calculates an address Addr at which data is to be read or written from the supplied addresses RA and RB, and the address Addr is set in a register.

In stage c2, writing or reading of data is performed based on the calculated address Addr. A plurality of registers have been provided for this purpose. Because data to be read has a data structure as illustrated in FIG. 2, the registers can hold such data. In stage c2, a section 101 enclosed by a dashed-dotted line including "data", "stat" and "ECC" of FIG. 5 exists in the main memory 14, and the "data", "stat" and "ECC" read from the main memory 14 are stored into corresponding registers 101a, 101b, 101c in the processor 1 respectively. In the case of data writing, the count value Tm of the timer 13a and the flag data 24b ("1") are set in the ECC status bits (stat).

In stage d3, in the case of data writing, read data and written data are merged by the group of selectors 32. In the case of data reading, read data (R data) for ECC calculation of a next stage is set in a register.

In stages e4 and f5, the ECC calculator 13b performs ECC calculation about the written data or the read data.

In stage g6, in the case of data writing, writing of the ECC and resetting of the flag data 24b to 0 about the data are performed. Further, the calculated ECC is stored in an ECC register 13c1. In the case of data reading, the difference device 33, the selector 34, and the comparator 35 operate to compare the ECCs. If the ECCs do not match as a result of the comparison, an ECC error is outputted from the comparator 35. The ECC error is transferred to the control unit 15. In stage g6, a section 102 enclosed by a dashed-dotted line including "stat" and "ECC" of FIG. 5 exists in the main memory 14.

If the flag data 24a of the read data has been set, the difference device 33 is used to determine an ECC register for comparison among the group of ECC registers 13c based on a difference between the read count value 24b and a count value of the timer 13a at a time of recalculation.

If the flag data 24a has been set, the selector 34 selects the recalculated ECC and the ECC of the ECC register for comparison such that the comparator 35 compares these ECCs. If the flag data 24a has not been set, the selector 34 selects the recalculated ECC and the read ECC, which are used to be compared by the comparator 35.

In stage h7, data of the ECC register 13c1 is transferred to a next ECC register 13c2.

In stage i8, data of the ECC register 13c2 is transferred to a next ECC register 13c3.

Although it is shown in FIG. 5 that signals from the three ECC registers 13c1, 13c2, 13c3 are inputted to the selector 34 through one signal line, signal lines from each of the ECC registers are inputted to the selector 34 in practice. Since each ECC is 9-bit data, twenty-seven signal lines are inputted from the group of ECC registers 13c to the selector 34.

In FIG. 5, an area FW enclosed by a dashed line represents the forwarding circuit.

Operation of the above described configuration of the load/store unit 13 will be described below while operation for data writing and operation for data reading will be separately described.

5. Operation 5.1 Operation for Data Writing

Figure 6:
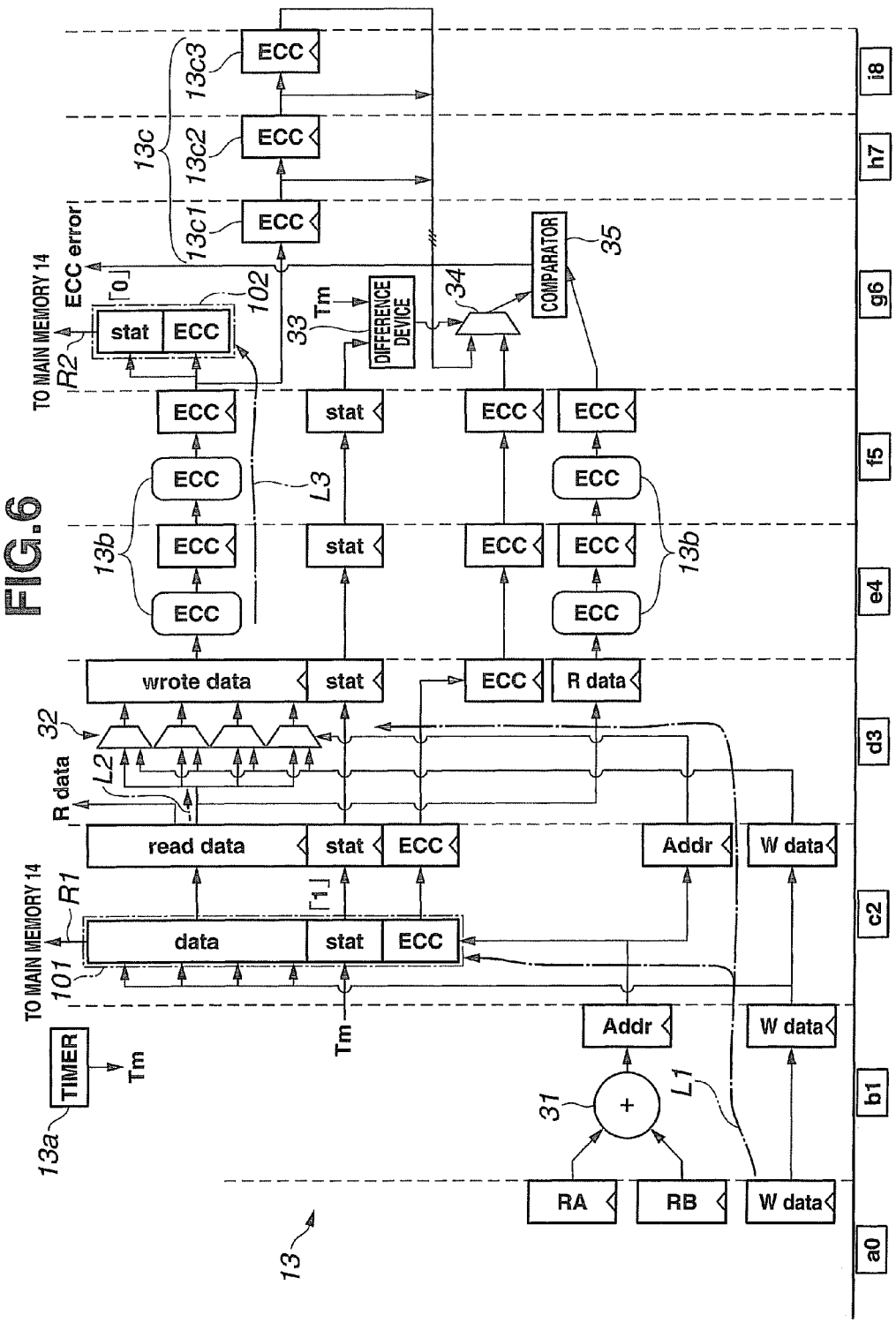
FIG. 6 is a diagram illustrating operation of the load/store unit 13 in a case of data writing according to the first embodiment of the present invention.

FIG. 6 is a diagram illustrating operation of the load/store unit 13 in the case of data writing.

In stage a0, the load/store unit 13 is given the addresses RA, RB of the main memory 14 and written data (W data).

In stage b1, an address Addr is calculated and identified from the RA and RB.

In stage c2, first, data of the address Addr is read. Written data (W data) is transferred to stage c2 as indicated by a dashed-dotted line L1. Then, "1" as the flag data 24a of the ECC status bits (stat) and the count value Tm of the timer 13a at this time are written together with the written data (W data) into the main memory 14 (first writing R1). Rewriting of ECC is not performed at this point. In other words, in the first writing, the flag data 24a is set to "1" indicating the ECC is not correct.

The data which is read in stage c2 is all bits (i.e., 128 bits) at the address Addr in which the written data (W data) is written. This is because in a case where only a part of the 128-bit data (that is, only data whose data size is less than an ECC assignment unit) is written, before the written data (W data) is written in the main memory 14, data before being updated is read from the main memory 14, and a part of the read data is merged with data of another part to generate 128-bit data which is the ECC assignment unit. This merge is performed in a next stage d3, and in subsequent stages e4, f5, an ECC about the merged data is calculated. For example, if only 16 bits are to be written within certain 128-bit data, remaining 112 bits are extracted from the read 128-bit data and merged with the 16 bits, and an ECC about the merged data is calculated and added. Therefore, if writing is performed across all bits which are an ECC assignment unit at a corresponding address, processing for reading all bits is not necessarily required.

In stage d3, as described above, the read data (indicated by a dashed-dotted line L2) and the written data (W data) (indicated by the dashed-dotted line L1) are merged by the group of selectors 32.

In stages e4, f5, an ECC about the merged data is calculated by the ECC calculator 13b as indicated by a dashed-dotted line L3.

In stage g6, the calculated ECC is written as ECC data of the data at the address Addr into the main memory 14 together with "0" as the flag data 24a of the ECC status bits (stat) (second writing R2). Thus, in the second writing, the flag data 24a is reset to "0", which indicates that the ECC is correct.

The ECC obtained in stage g6 is written in the first ECC register 13c1. In stage h7, data of the first ECC register 13c1 is written in the second ECC register 13c2, and in stage i8, data of the second ECC register 13c2 is written in the third ECC register 13c3. In this way, the ECC is held by the plurality of ECC registers for forwarding in stages g6 to i8.

As described above, in the case of data writing, writing of data into the memory 14 and writing of an ECC of the data are separated, and the flag data of the ECC status bits (stat) is rewritten so as to indicate that the ECC is being recalculated (i.e., the ECC is not correct) until the ECC is rewritten.

5.2 Operation for Data Reading (where the Flag Data 24a is "0")

Figure 7:
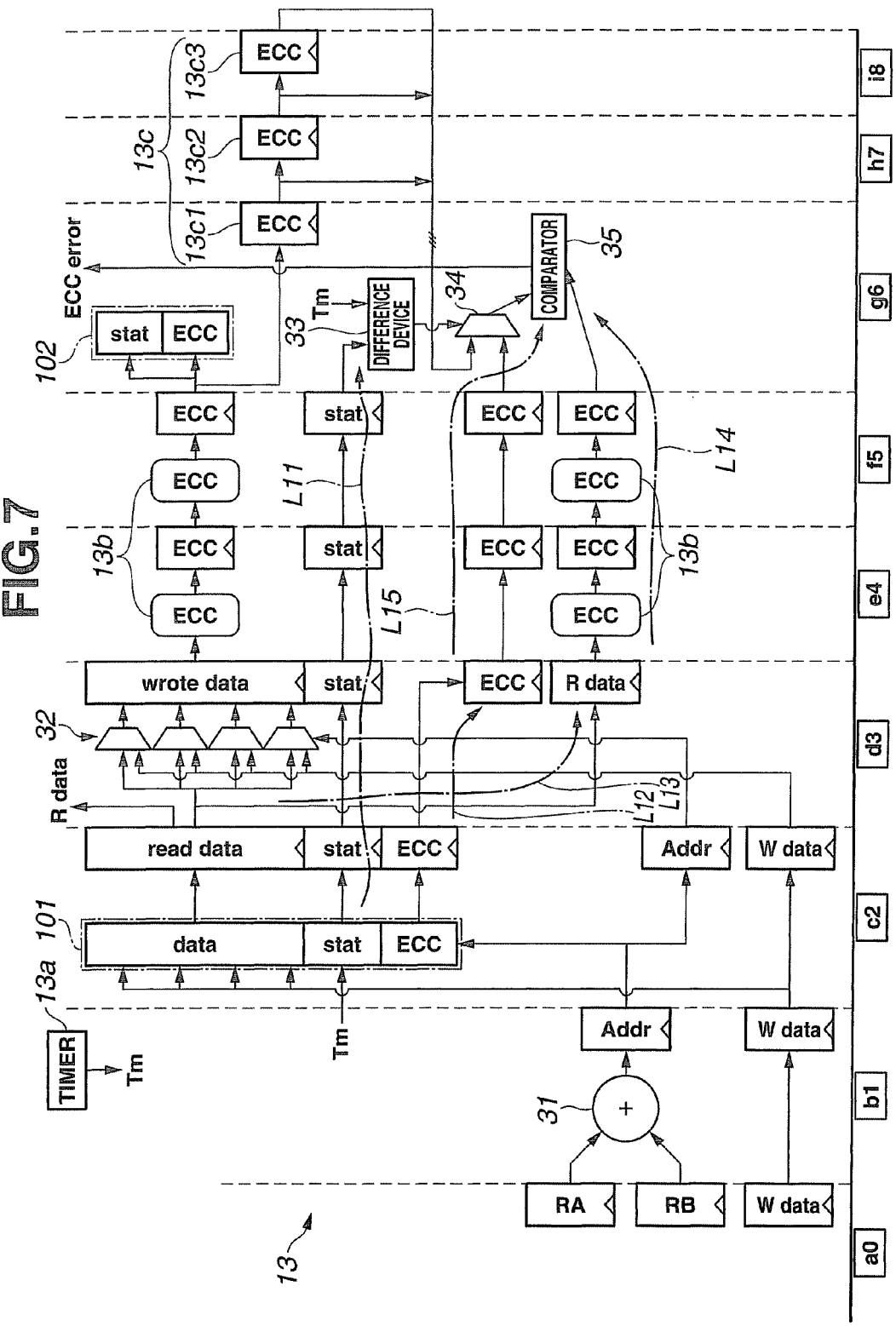
FIG. 7 is a diagram illustrating operation of the load/store unit 13 in a case where flag data 24a is "0" when data is read according to the first embodiment of the present invention.

FIG. 7 is a diagram illustrating operation of the load/store unit 13 in a case where flag data 24a is "0" when data is read. When the flag data 24a included in ECC status bits (stat) of read data is "0", the flag data 24a indicates that a read ECC is correct.

In stages a0 and b1, the same processing as of the writing is executed. ECC status bits (3-bit data) of read data is transferred from stage c2 to stage f5 as indicated by a dashed-dotted line L11.

If the flag data 24a is "0" in stage c2, then in stage d3, a read ECC is set in a register for ECC as indicated by a dashed-dotted line L12, and the read data is set in a corresponding register (R data) as shown in a dashed-dotted line L13.

In stages e4, f5, an ECC is recalculated from the read data (R data) as indicated by a dashed-dotted line L14. Further, in stages e4, f5, the read ECC is transferred as indicated by a dashed-dotted line L15.

In stage g6, since the flag data 24a is "0", the difference device 33 outputs a selection signal to the selector 34 so that the transferred ECC is selected as indicated by the dashed-dotted line L15. The comparator 35 compares the read ECC with the recalculated ECC. In other words, since the read ECC is correct when the flag data 24a is "0", the selector 34 outputs the read ECC to the comparator 35, and the comparator 35 compares the recalculated ECC with the read ECC to check whether the read data is correct or not, that is, to make ECC error determination. If two sets of ECC status bits are not identical as a result of the comparison, the comparator 35 outputs an ECC error to the control unit 15.

5.3 Operation for Data Reading (where the Flag Data 24a is "1")

Figure 8:
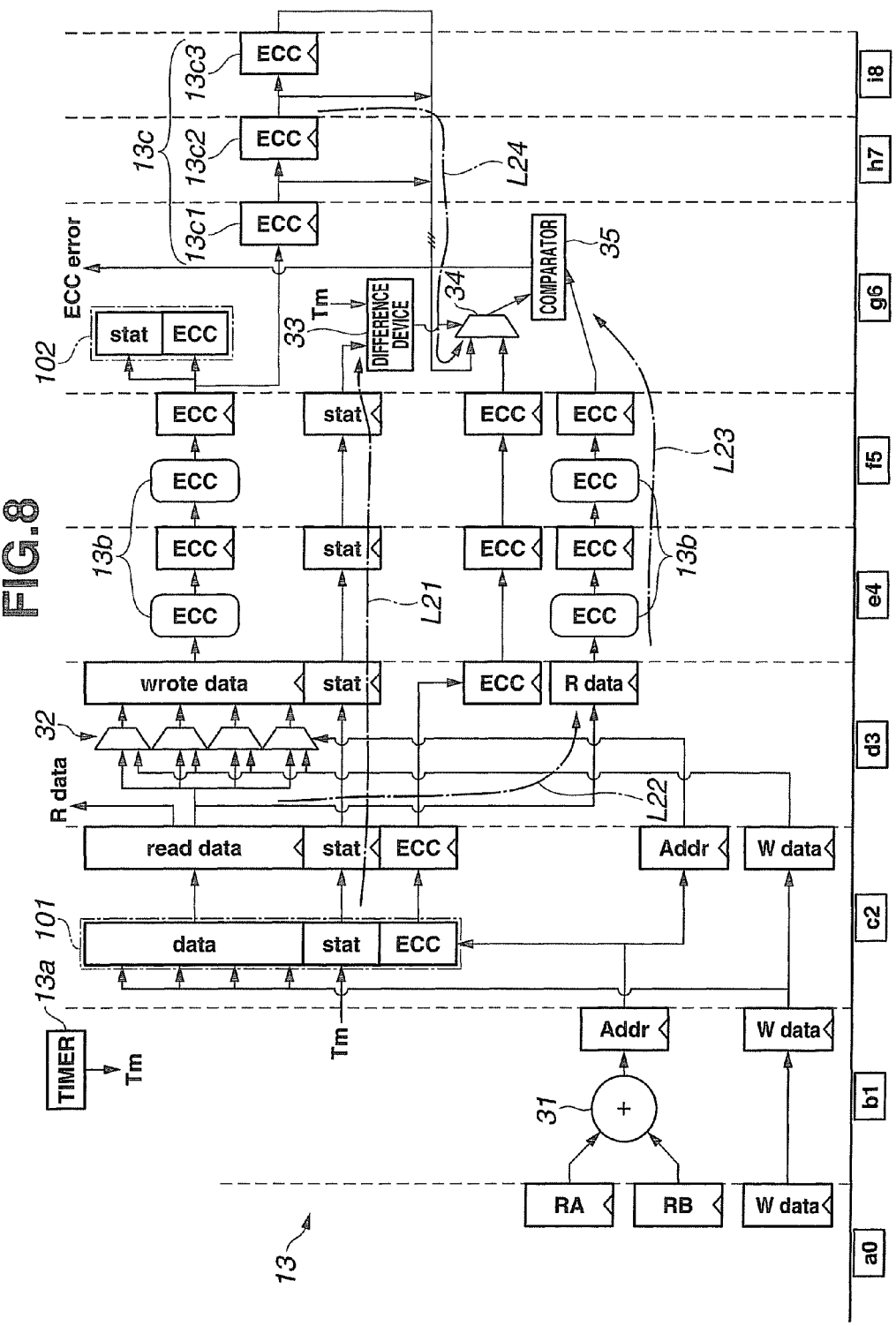
FIG. 8 is a diagram illustrating operation of the load/store unit 13 in a case where the flag data 24a is "1" when data is read according to the first embodiment of the present invention.

FIG. 8 is a diagram illustrating operation of the load/store unit 13 in a case where the flag data 24a is "1" when data is read. When the flag data 24a included in ECC status bits (stat) of read data is "1", the flag data 24a indicates that a read ECC is not correct.

In stages a0 and b1, the same processing as of the writing is executed. ECC status bits (3-bit data) of read data is transferred from stage c2 to stage f5 as indicated by a dashed-dotted line L21.

In stage d3, the read data is set in a corresponding register (R data) as shown in a dashed-dotted line L22.

In stages e4, f5, an ECC is recalculated from the read data (R data) as indicated by a dashed-dotted line L23.

In stage g6, since the flag data 24a is "1", the difference device 33 outputs a selection output to the selector 34 so that an ECC register among the group of ECC registers 13c is selected according to a difference between the count value 24b included in ECC status bits (stat) and the count value Tm at this time of the timer 13a.

As described above, the count value 24b of the read ECC status bit section 24 is a value (count value) of the timer 13a at a time when the data is written. According to a difference from the present count value Tm of the timer 13a, an ECC register in which an ECC about the read data (R data) is stored is selected from the three ECC registers 13c.

For example, it is assumed that a count value of ECC status bits (stat) of the read data (R data) is "11" (i.e., 3) and a present count value of the timer 13a to be compared in stage g6 is "01" (i.e., 1). Then, how many cycles ahead store of the ECC into the group of ECC registers 13c is can be determined using a following equation (1).

The number of preceding cycles=((count value of ECC status bits)−(present count value of timer)+ (difference in the number of cycles between stages g6 and c2)) % 4     Equation (1)

In the above described case, the number of preceding cycles is ((3)−(1)+(4))=2. Therefore, the store into the group of ECC registers 13c is two cycles ahead.

Accordingly, the difference device 33 outputs a selection signal to the selector 35 so that the selector 35 selects an output of an ECC register which stores the ECC corresponding to the read data (R data) based on an operation of the equation (1).

FIG. 8 shows that an output of the ECC register 13c2 which holds an ECC two cycles before is selected by the selector 34, and the selected ECC is compared with a recalculated ECC by the comparator 35.

Specifically, an ECC corresponding to the number of cycles is held in the group of ECC registers 13c, a difference between the count value 24b of read data (R data) and the present count value Tm is calculated by the difference device 33, and one output of an ECC register among the three registers is selected according to the difference and supplied to the comparator 35. The comparator 35 compares an ECC from one of the three ECC registers with the recalculated ECC. If two sets of ECC status bits are not identical as a result of the comparison, the comparator 35 outputs an ECC error to the control unit 15.

As described above, when writing data in the main memory 14, the load/store unit 13 writes written data (W data) and the count value 24b in the main memory 14, and sets the flag data 24a which indicates that an ECC about the written data is not correct in the main memory 14. After the setting, the load/store unit 13 causes the ECC calculator 13b to calculate the ECC about the written data (W data), and after the ECC is calculated, writes the calculated ECC in the main memory 14 and resets the flag data 24a.

When reading data from the main memory 14, the load/store unit 13 reads the data, and the flag data 24a, the count value 24b and the ECC about the data from the main memory 14, and executes recalculation of an ECC from the read data (R data). If the flag data 24a about the read data (R data) has been set, the load/store unit 13 determines an ECC register for comparison from the read count value 24b from among the group of ECC registers 13c, and compares the ECC recalculated from the read data with the ECC of the ECC register for comparison. If the flag data 24a about the read data (R data) has not been set, the load/store unit 13 compares the ECC recalculated from the read data (R data) with the read ECC, so that ECC error is determined.

6. Advantages

As described above, according to the processor of the present embodiment, the forwarding circuit does not have an address comparator circuit and a register for written data as used in a conventional art, and a circuit size of the forwarding circuit can be reduced, and consequently an area of the forwarding circuit on a chip can also be reduced. In the processor 1 of the present embodiment, if an ECC is 9 bits, wiring from each ECC register requires only nine lines in the forwarding circuit. Further, since an address comparator circuit and a register for data writing does not exist, electrical power consumption of the processor 1 can be reduced.

(Second Embodiment)

In the first embodiment, if an ECC of read data (R data) is not correct, an ECC register which holds an ECC corresponding to the read data (R data) is selected from the group of ECC registers 13c using a value of a timer, while in the present embodiment, if an ECC of read data (R data) is not correct, a processor flushes pipeline processing for reading and thereby stops reading of the data, and executes reading of the data again.

1. Configuration

Hereinafter, the processor according to the present embodiment will be described, in which the same components as in the first embodiment are given the same numbers, and description thereof will be omitted. Particularly, a configuration of a load/store unit differs from that of the first embodiment, and will be mainly described.

Figure 9:
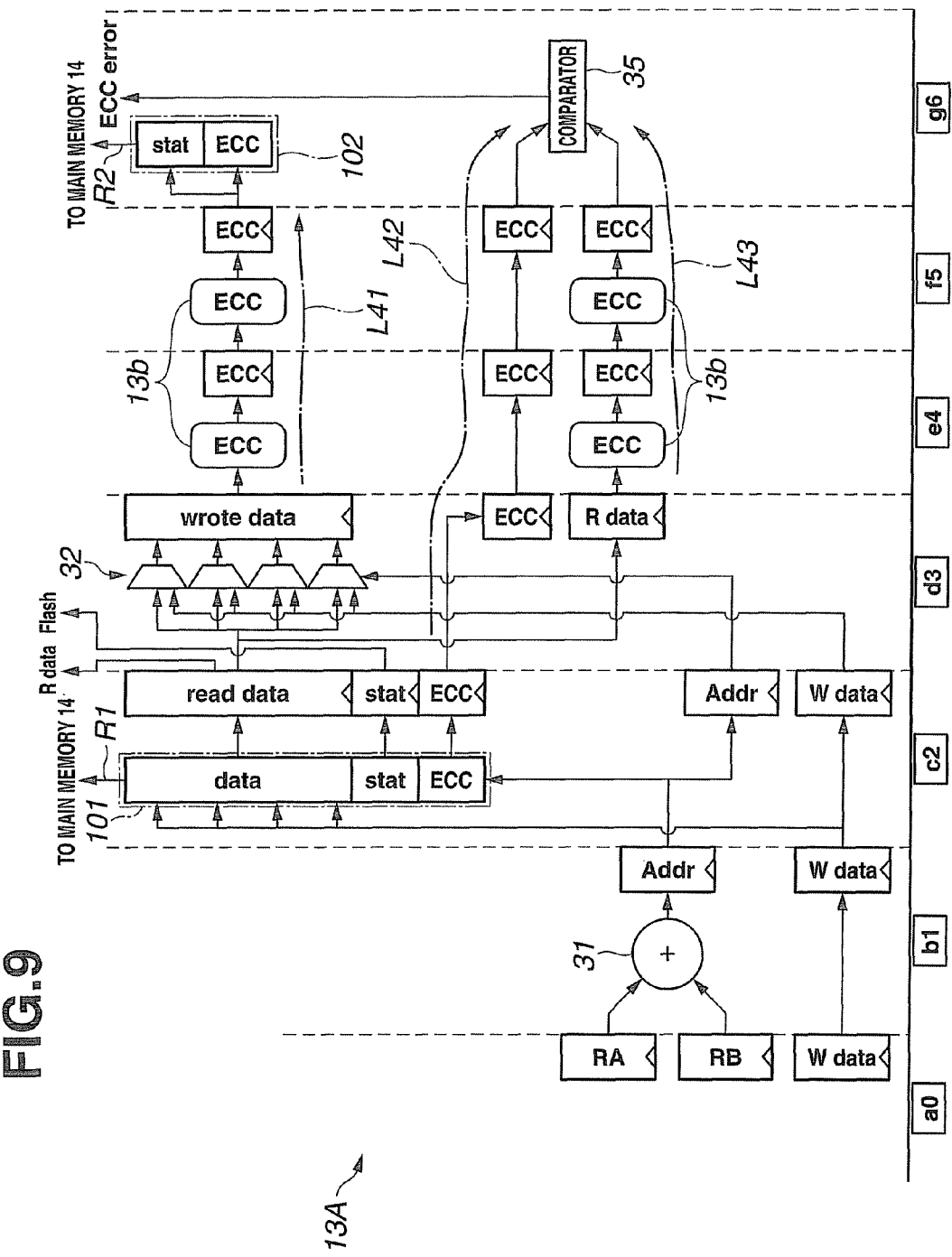
FIG. 9 is a configuration diagram showing a configuration of a load/store unit 13A according to a second embodiment of the present invention.

FIG. 9 is a configuration diagram showing a configuration of a load/store unit 13A. As shown in FIG. 9, the load/store unit 13A has a pipeline structure and includes seven stages. The load/store unit 13A has an address calculator 31, a group of selectors 32, an ECC calculator 13b, and a comparator 35, but does not have components corresponding to the timer 13a, the group of ECC registers 13c, the difference device 33, and the selector 34 in the first embodiment.

An ECC status bit (stat) is one bit. The one bit is flag data 24a as described above and does not include a counter value.

(Operation)

In the configuration shown in FIG. 9, in the case of data writing, "1" of the flag data 24a as well as data are written in the main memory 14 in stage c2 (first writing R1).

Then, after an ECC is calculated in stages e4 and f5 as indicated by a dashed-dotted line L41, the calculated ECC is written in the main memory 14 together with the flag data 24a "0" of an ECC status bit (stat) in stage g6 (second writing R2).

In the case of data reading, if the flag data 24a of an ECC status bit of read data is "0", an ECC of the read data (R data) is transferred as indicated by a dashed-dotted line L42. In addition, an ECC about the read data (R data) is recalculated by the ECC calculator 13b as indicated by a dashed-dotted line L43. Then, in stage g6, comparison between the recalculated ECC and the read ECC is performed.

On the other hand, if the flag data 24a of the ECC status bit of the read data is "1" in the case of data reading, the read ECC is not correct, and therefore, a signal which instructs to flush read processing is outputted to the control unit 15 so that pipeline processing for reading is stopped, and processing for reading data at the same address is executed again.

To re-execute the read processing, the control unit 15 instructs to start the re-execution after receiving the flush instruction from the load/store unit 13A.

As described above, when writing data in the main memory 14, the load/store unit 13A writes written data (W data) in the main memory 14, and sets the flag data 24a which indicates that an ECC about the written data (W data) is not correct in the main memory 14. After the setting, the load/store unit 13A causes the ECC calculator 13b to calculate the ECC about the written data (W data), and after the ECC is calculated, writes the calculated ECC in the main memory 14 and resets the flag data 24a.

When reading data from the main memory 14, the load/store unit 13A reads the data, and the flag data 24a and the ECC about the data from the main memory 14, and if the flag data 24a has been set, the load/store unit 13A executes reading of the data again, and if the flag data 24a has not been set, the load/store unit 13A compares the ECC recalculated from the read data (R data) with the read ECC, so that ECC error is determined.

(Advantages)

As described above, according to the present embodiment, if flag data indicating an ECC is not correct has been set when data is read, pipeline processing for reading the data is flushed, and processing for reading the same data is executed again. Thereby, the group of ECC registers 13c and the like in the first embodiment can be omitted so that the forwarding circuit can be further simplified.

In addition, the present embodiment has an advantage that an ECC status bit in the main memory 14 requires only one bit.

Thus, according to the above described embodiments, in a case where calculation of an ECC requires time, when data is stored in the storage section, only writing of the data is performed in advance, and writing of the ECC is then performed with a delay. Thereby, a processor can be provided in which the number of cycles required for storing of data can be reduced, and a forwarding circuit for subsequent loading of data can be simplified.

As described above, a processor according to the above described embodiments does not require an address comparator circuit and the like, so that a size of a forwarding circuit can be reduced, and an area of the forwarding circuit on a semiconductor chip can be reduced.

Although the load/store unit 13 performs storing and loading of data with respect to the main memory 14 as a storage section in the above described embodiments, the storage section may be a cache memory or a local memory.

Although the main memory 14 is incorporated in one semiconductor chip of the processor 1 in the above described embodiments, the main memory 14 may be incorporated in a semiconductor chip different from the processor 1 including the ALU 11. In this case, the main memory 14 is connected to the processor 1 through a bus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the Rhin of the embodiments described herein may be made without departing from the spirit of the inventions. The accompanying claims and their equivalents are intended to cover such forms or modifications as would fall within the scope and spirit of the inventions.

What is claimed is:

1. A processor which can execute pipeline processing, comprising:
   an ALU; and
   a load/store unit,
   wherein when the load/store unit writes data in a storage section, the load/store unit writes written data and a count value counted according to a predetermined clock in the storage section, and sets an ECC status flag which indicates that an ECC about the written data is not correct in the storage section, and causes calculation of the ECC about the written data after setting the ECC status flag, and writes the calculated ECC in the storage section and resets the ECC status flag after the ECC is calculated, and
   wherein when the load/store unit reads data from the storage section, the load/store unit reads the data, and the ECC status flag, the count value and the ECC about the data from the storage section, and executes recalculation of an ECC from the read data, and if the ECC status flag about the read data has been set, the load/store unit determines an ECC for comparison among ECGs held by a plurality of registers based on the read count value, and compares the recalculated ECC with the ECC for comparison, and if the ECC status flag about the read data has not been set, the load/store unit compares the recalculated ECC with the read ECC, so that ECC error is determined.

2. The processor according to claim 1, wherein if the written data is a part of data read from the storage section, before the load/store unit writes the written data in the storage section, the load/store unit reads data before being updated by writing the written data from the storage section, and generates data to be written from the read data and the part of data to write the written data in the storage section.

3. The processor according to claim 1,
   wherein the load/store unit has a difference device, and
   wherein if the ECC status flag of the read data has been set, the difference device determines the ECC for comparison based on a difference between the read count value and a count value of the counter at a time of the recalculation.

4. The processor according to claim 1,
   wherein the load/store unit has a selector and a comparator, and
   wherein, if the ECC status flag has been set, the selector selects the recalculated ECC and the ECC for comparison and causes the comparator to compare the recalculated ECC with the ECC for comparison, and if the ECC status flag has not been set, the selector selects the recalculated ECC and the read ECC and causes the comparator to compare the recalculated ECC with the read ECC.

5. The processor according to claim 1, wherein the ECC status flag is data of at least one bit, and the count value is data of at least two bits.

6. The processor according to claim 1, wherein the ECC status flag is data of one bit, and the count value is data of two bits.

7. The processor according to claim 1, further comprising a register file,
   wherein, when the load/store unit writes the data in the storage section, the load/store unit writes data of the register file in the storage section, and when the load/store unit reads the data from the storage section, the load/store unit writes the data of the storage section in the register file.

8. The processor according to claim 1, further comprising a control unit,
   wherein the load/store unit transmits a result of the ECC error determination to the control unit.

9. The processor according to claim 1, wherein the load/store unit has a counter configured to count the counter value and an ECC calculator configured to calculate the ECC.

10. The processor according to claim 1, wherein the storage section is a main memory, a cache memory, or a local memory.

11. The processor according to claim 1, wherein the storage section, the load/store unit, the ALU, and the plurality of ECC registers, are provided on one semiconductor chip.

12. A processor which can execute pipeline processing, comprising:
    an ALU; and
    a load/store unit,
    wherein when the load/store unit writes data in a storage section, the load/store unit writes written data in the storage section and sets an ECC status flag which indicates that an ECC about the written data is not correct in the storage section, and causes calculation of the ECC about the written data after setting the ECC status flag, and writes the calculated ECC in the storage section and resets the ECC status flag after the ECC is calculated, and
    wherein when the load/store unit reads data from the storage section, the load/store unit reads the data, and the ECC status flag and the ECC about the data from the storage section, and if the ECC status flag has been set, the load/store unit executes reading of the data again, and if the ECC status flag has not been set, the load/store unit executes recalculation of an ECC from the read data, and compares the recalculated ECC with the read ECC, so that ECC error is determined.

13. The processor according to claim 12, wherein if the written data is a part of data read from the storage section, before the load/store unit writes the written data in the storage section, the load/store unit reads data before being updated by writing the written data from the storage section, and generates data to be written from the read data and the part of data to write the written data in the storage section.

14. The processor according to claim 12, wherein the ECC status flag is data of at least one bit.

15. The processor according to claim 12, wherein the ECC status flag is data of one bit.

16. The processor according to claim 12, further comprising a register file,
    wherein, when the load/store unit writes the data in the storage section, the load/store unit writes data of the register file in the storage section, and when the load/ store unit reads the data from the storage section, the load/store unit writes the data of the storage section in the register file.

17. The processor according to claim 12, further comprising a control unit,
wherein the load/store unit transmits a result of the ECC error determination to the control unit.

18. The processor according to claim 12, wherein the storage section is a main memory, a cache memory, or a local memory.

19. The processor according to claim 12, wherein the storage section, the ALU, and the load/store unit, are provided on one semiconductor chip.

20. A processor which can execute pipeline processing, comprising:
an ALU; and
a load/store unit,
wherein when the load/store unit writes data in a storage section, the load/store unit executes first write processing for writing written data, a count value counted according to a predetermined clock, and an ECC status flag which indicates that an ECC about the written data is not correct in the storage section, and second write processing for writing the ECC about the written data and ECC status flag which indicates that the ECC about the written data is correct in the storage section,
wherein when the load/store unit reads data from the storage section, the load/store unit reads the data, and the ECC status flag, the count value and the ECC about the data from the storage section, and executes recalculation of an ECC from the read data, and if the ECC status flag which indicates that the ECC about the read data is not correct has been written, the load/store unit determines an ECC for comparison among ECCs held by a plurality of registers based on the read count value, and compares the ECC recalculated from the read data with the ECC for comparison, and if the ECC status flag which indicates that the ECC is correct has been written, the load/store unit compares the ECC recalculated from the read data with the read ECC, so that ECC error is determined.

* * * * *